(12) United States Patent
Miyagawa

(10) Patent No.: US 8,953,081 B2
(45) Date of Patent: Feb. 10, 2015

(54) IMAGE PROCESSING APPARATUS, IMAGE PROCESSING METHOD, AND STORAGE MEDIUM STORING IMAGE PROCESSING PROGRAM

(75) Inventor: Tomohiro Miyagawa, Shiki (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 13/131,679

(22) PCT Filed: Dec. 7, 2009

(86) PCT No.: PCT/JP2009/006665
§ 371 (c)(1),
(2), (4) Date: May 27, 2011

(87) PCT Pub. No.: WO2010/067574
PCT Pub. Date: Jun. 17, 2010

(65) Prior Publication Data
US 2011/0228109 A1 Sep. 22, 2011

(30) Foreign Application Priority Data
Dec. 12, 2008 (JP) .................................. 2008-317285

(51) Int. Cl.
H04N 5/222 (2006.01)
H04N 5/765 (2006.01)
G06F 3/0481 (2013.01)
H04N 1/00 (2006.01)
H04N 5/775 (2006.01)

(52) U.S. Cl.
CPC .............. *H04N 5/765* (2013.01); *G06F 3/0481* (2013.01); *H04N 1/00411* (2013.01); *H04N 1/00421* (2013.01); *H04N 1/00437* (2013.01); *H04N 1/0044* (2013.01); *H04N 1/00442* (2013.01); *H04N 1/00453* (2013.01); *H04N 1/00458* (2013.01); *H04N 1/00461* (2013.01); *H04N 1/00204* (2013.01); *H04N 5/775* (2013.01); *H04N 2201/0087* (2013.01)
USPC .............. 348/333.05; 348/231.99; 348/231.6; 345/634

(58) Field of Classification Search
USPC .............. 348/333.05, 231.99, 231.6; 345/634
See application file for complete search history.

(56) References Cited

U.S. PATENT DOCUMENTS

| 2002/0036702 A1* | 3/2002 | Ohnogi ..................... 348/333.05 |
| 2003/0063198 A1* | 4/2003 | Yokokawa .................. 348/231.2 |
| 2005/0240865 A1* | 10/2005 | Atkins et al. .................. 715/517 |
| 2007/0296737 A1* | 12/2007 | Park et al. ..................... 345/634 |
| 2013/0120634 A1* | 5/2013 | Morimoto et al. ........ 348/333.05 |

FOREIGN PATENT DOCUMENTS

| JP | 2001-249653 A | 9/2001 |
| JP | 2002-358171 A | 12/2002 |

(Continued)

*Primary Examiner* — Anthony J Daniels
(74) *Attorney, Agent, or Firm* — Canon USA, Inc. IP Division

(57) ABSTRACT

An image processing apparatus for displaying an image read from a recording medium has a mechanism capable of displaying an image for a desired page immediately after an instruction has been given by a user to change a page to be displayed. The image processing apparatus includes a priority determination unit that determines the priorities of pages, and a page specifying unit for allowing a user to change a page to be displayed. In accordance with a result of the priority determination unit, the reading of image data from an image recording medium is started without waiting for the page specifying unit to be operated.

16 Claims, 22 Drawing Sheets

(56) References Cited

FOREIGN PATENT DOCUMENTS

| | | |
|---|---|---|
| JP | 2003-256187 A | 9/2003 |
| JP | 2005-269077 A | 9/2005 |
| JP | 2006-221406 A | 8/2006 |
| JP | 2008-097453 A | 4/2008 |

* cited by examiner

[Fig. 1]
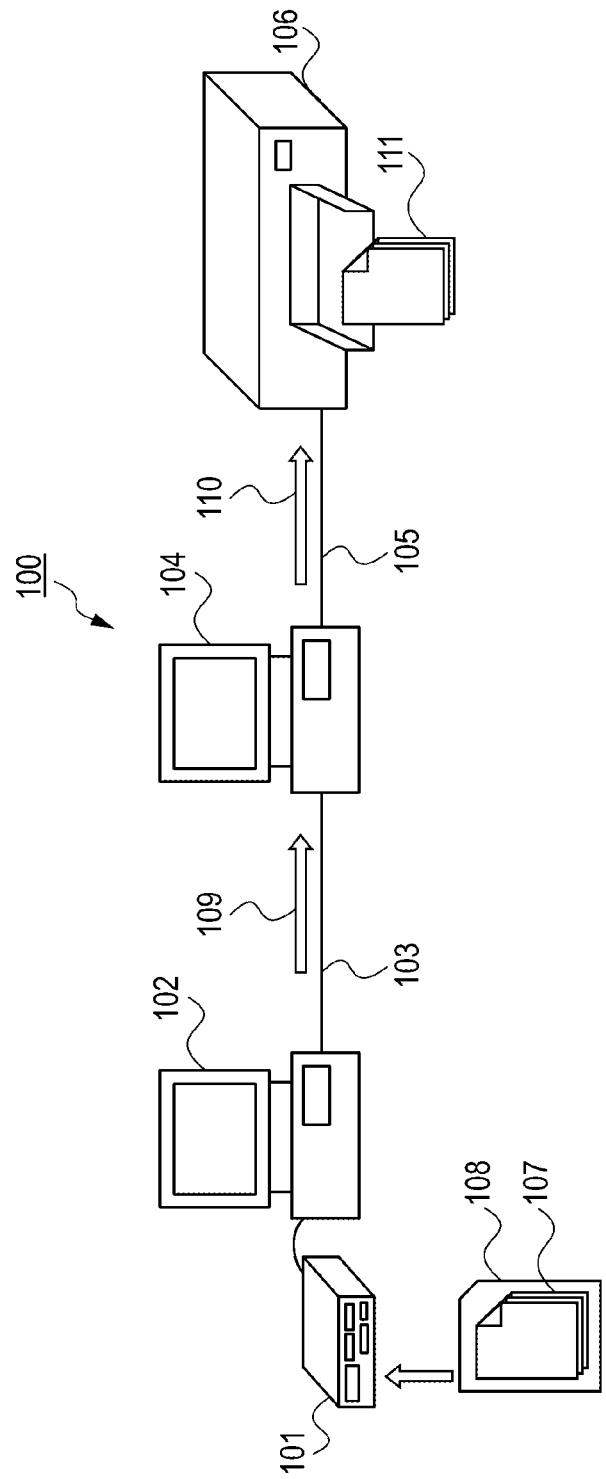

[Fig. 2]
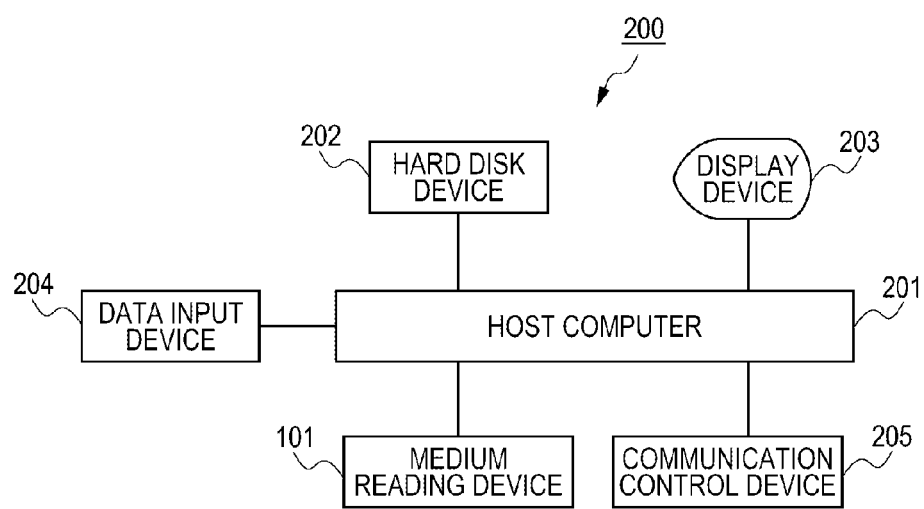

[Fig. 3]
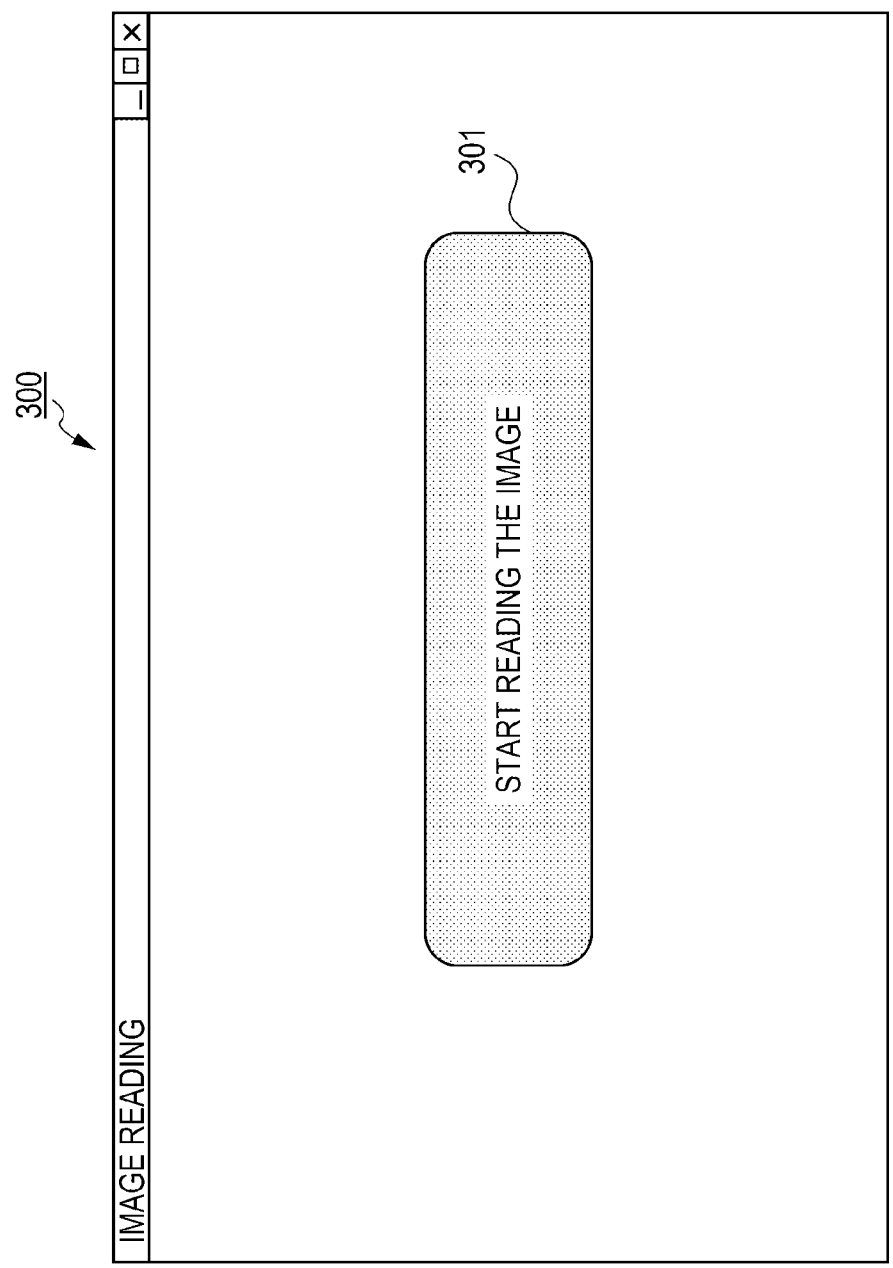

[Fig. 4]
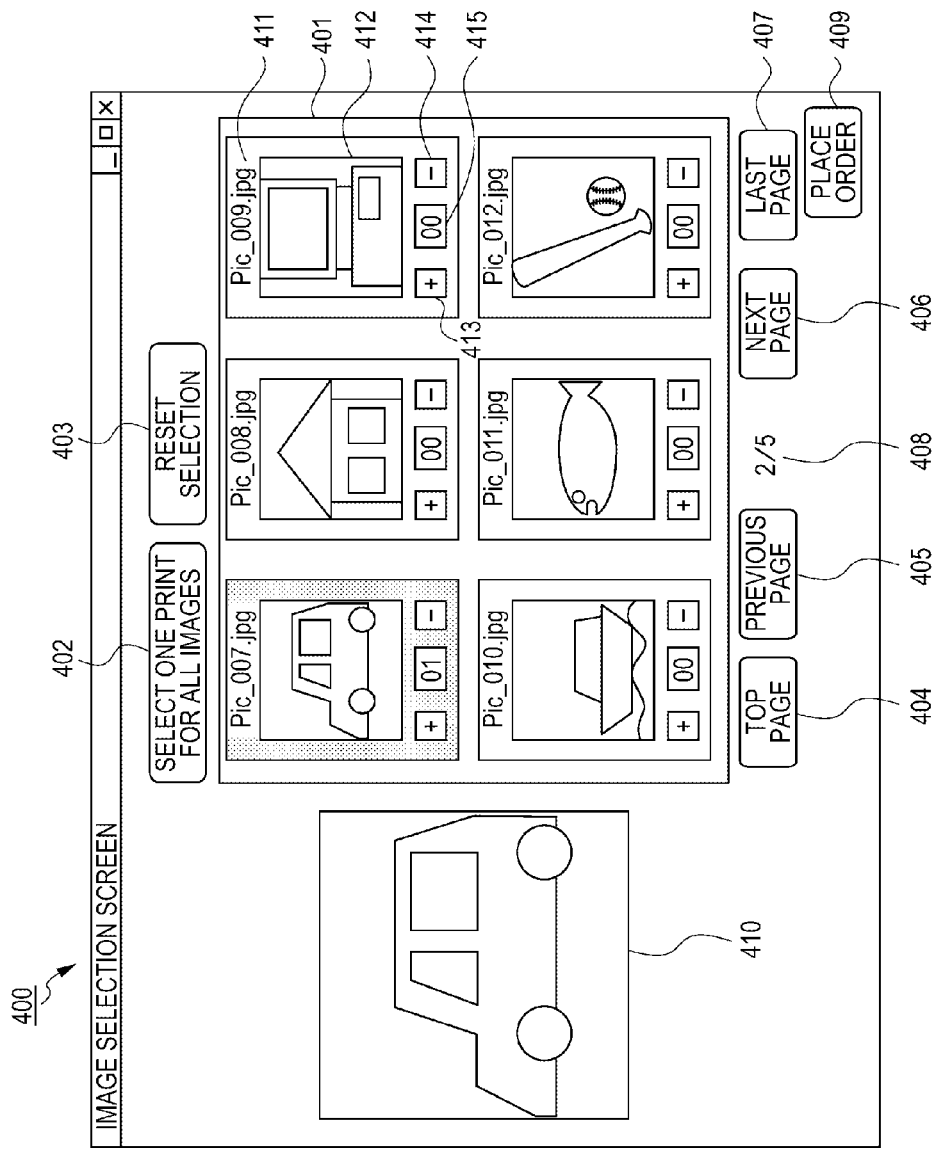

[Fig. 5]
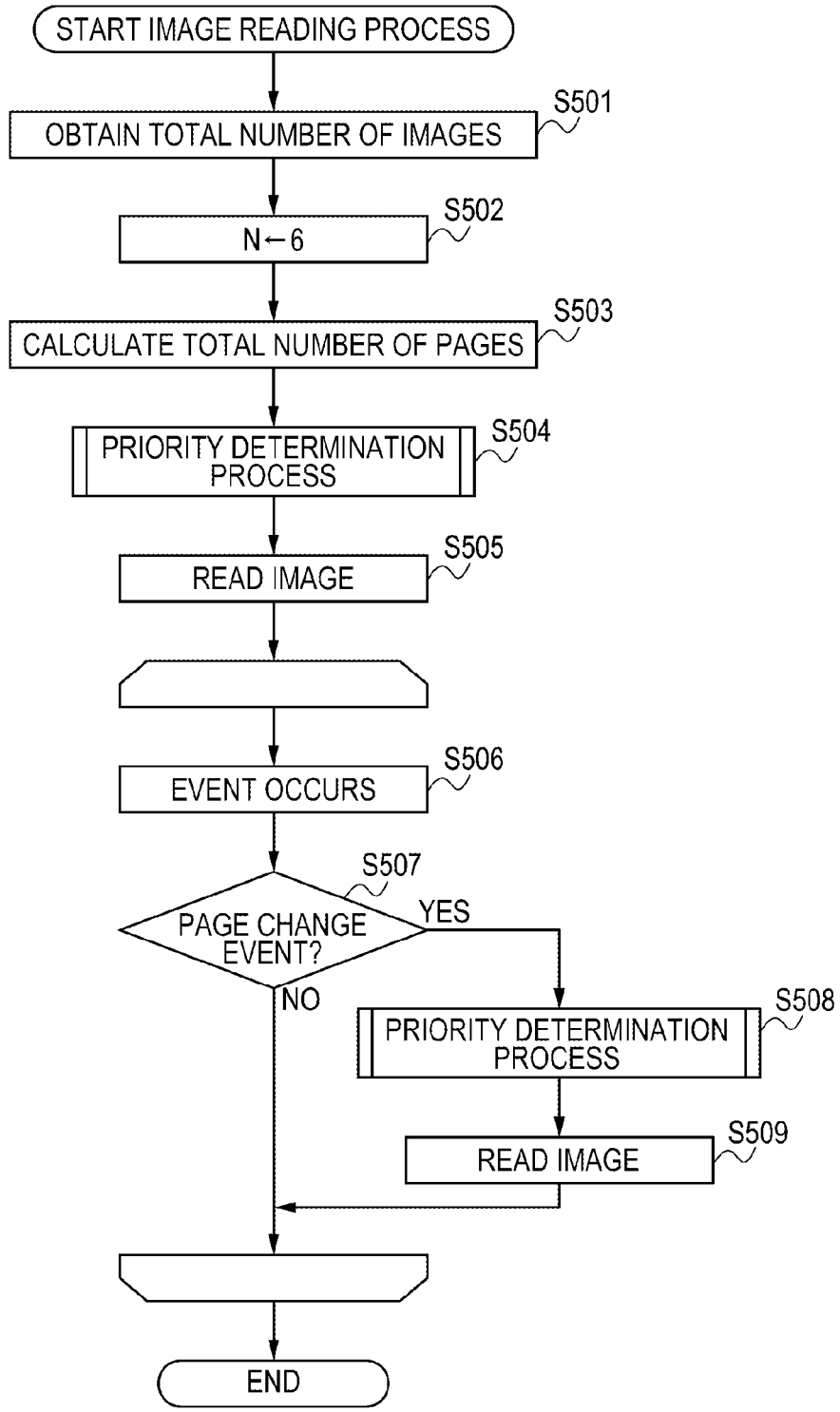

[Fig. 6]
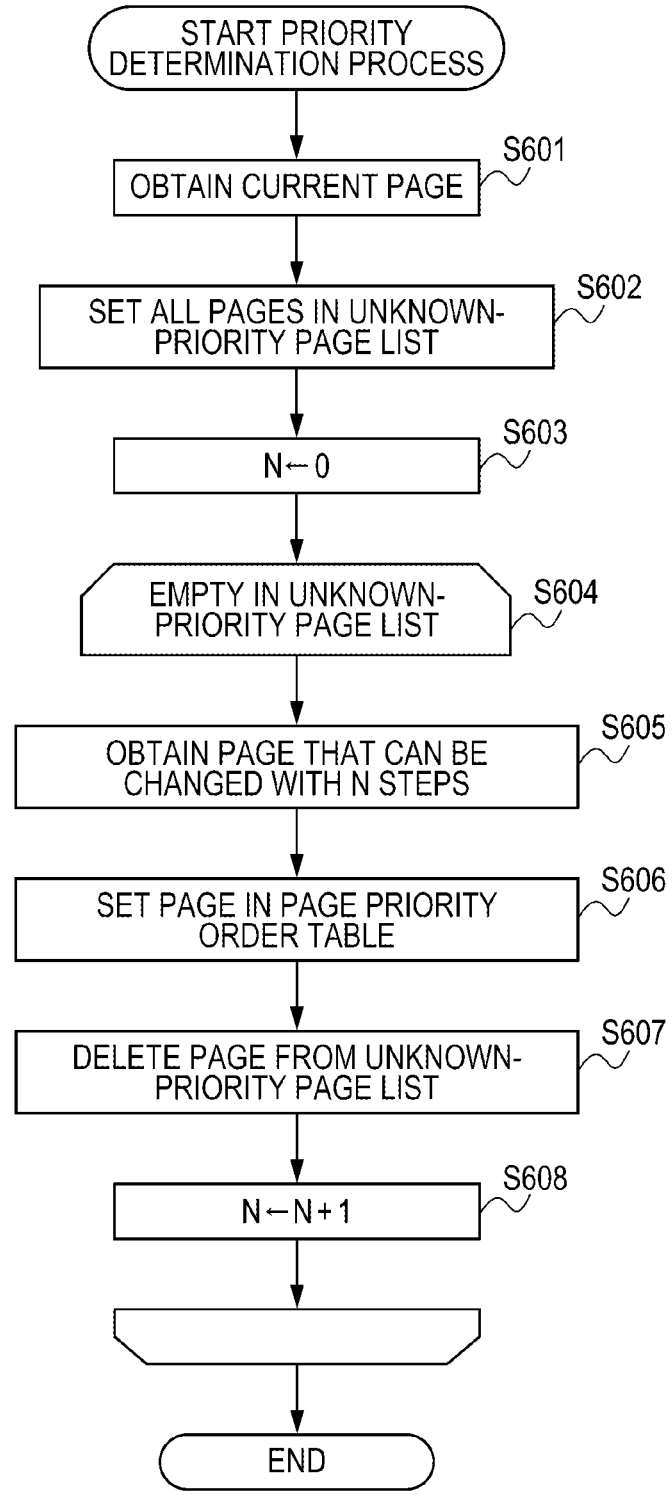

[Fig. 7A]

| PRIORITY | NUMBER OF STEPS | PAGE NUMBER |
|---|---|---|

701

| PAGE NUMBER |
|---|
| 1 |
| 2 |
| 3 |
| 4 |
| 5 |
| 6 |
| 7 |
| 8 |
| 9 |
| 10 |

| PRIORITY | NUMBER OF STEPS | PAGE NUMBER |
|---|---|---|
| FIRST | 0 | 6 |

801

| PAGE NUMBER |
|---|
| 1 |
| 2 |
| 3 |
| 4 |
| 5 |
| 7 |
| 8 |
| 9 |
| 10 |

| PRIORITY | NUMBER OF STEPS | PAGE NUMBER |
|---|---|---|
| FIRST | 0 | 6 |
| SECOND | 1 | 1 |
|  |  | 5 |
|  |  | 7 |
|  |  | 10 |

| PAGE NUMBER |
|---|
| 2 |
| 3 |
| 4 |
| 8 |
| 9 |

901　　902

[Fig. 7D]
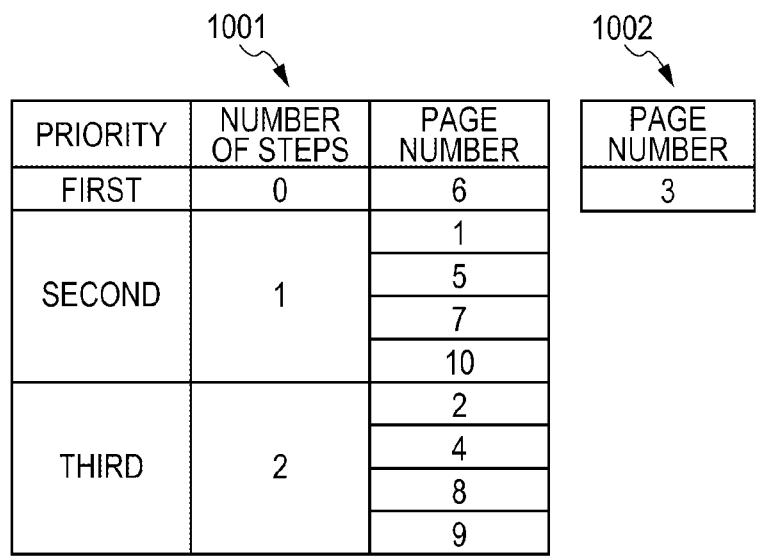
[Fig. 7E]
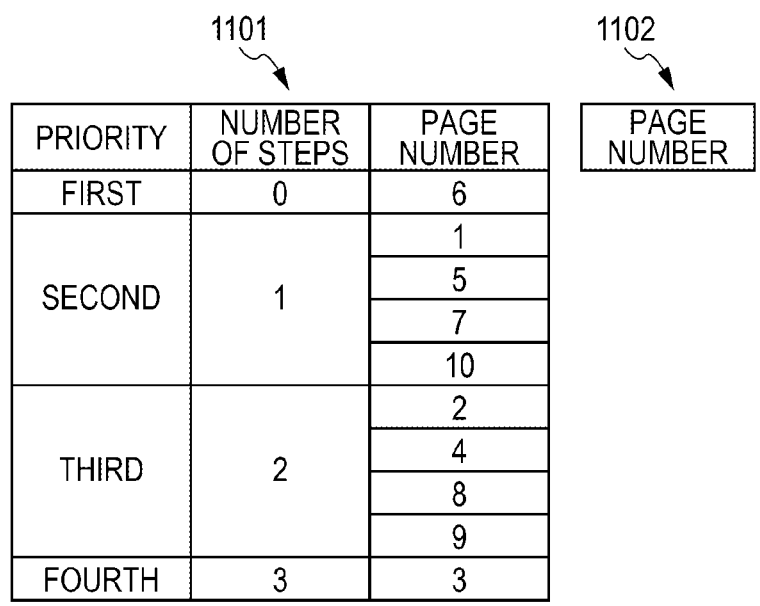

[Fig. 8]
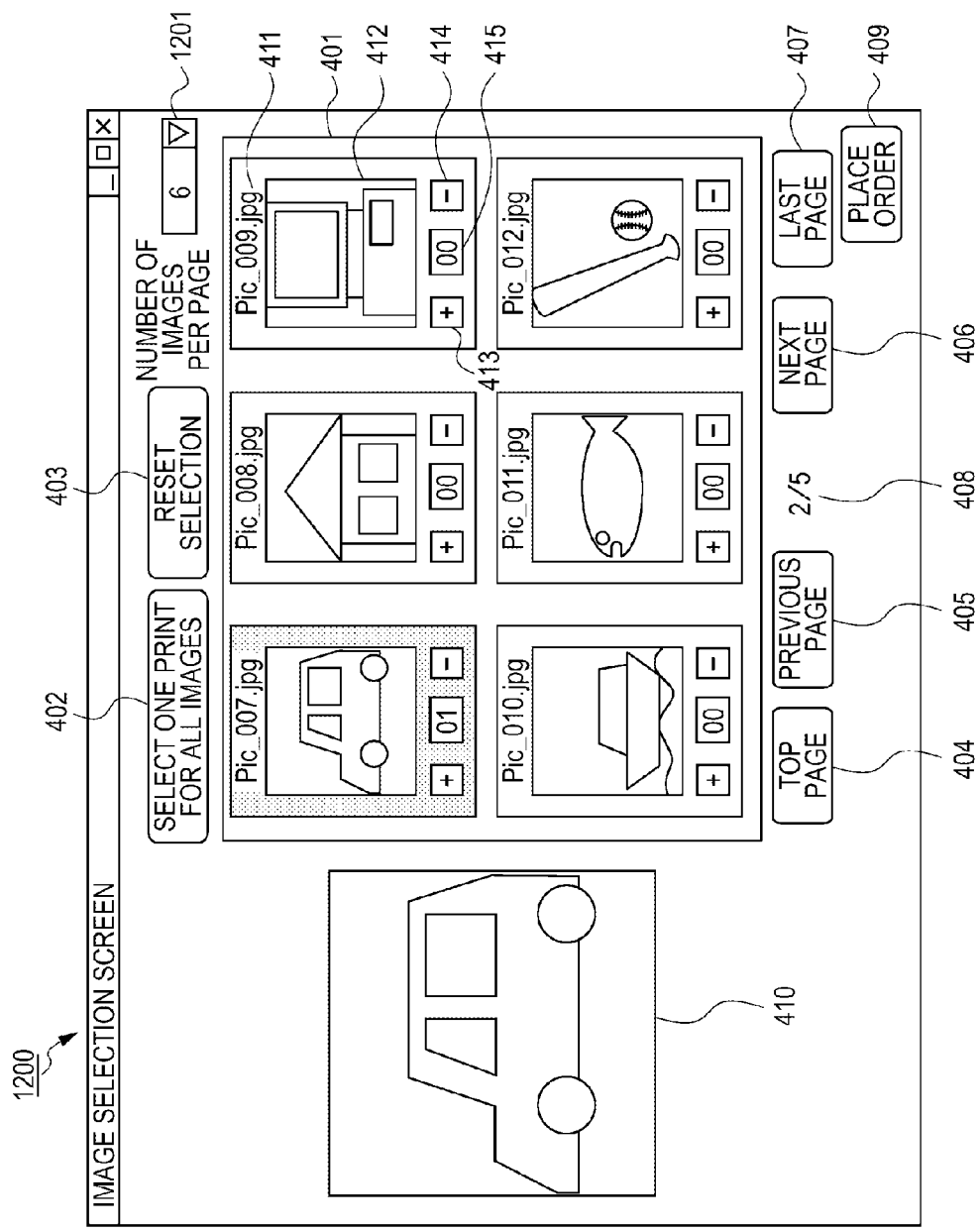

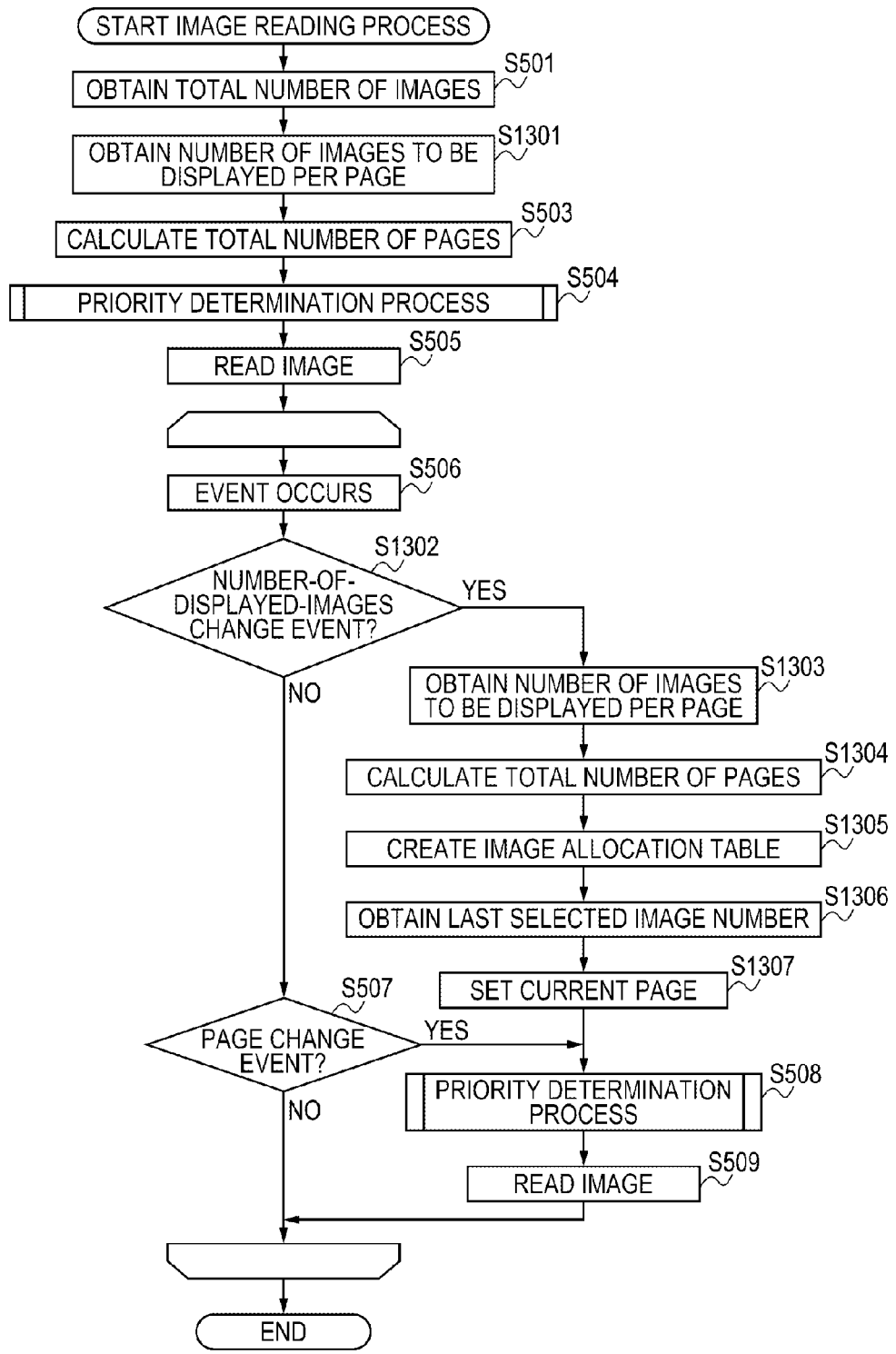
[Fig. 9]

[Fig. 10]
| PAGE NUMBER | INDEX OF FIRST IMAGE ON PAGE | INDEX OF LAST IMAGE ON PAGE |
|---|---|---|
| 1 | 1 | N*1 |
| 2 | N*1+1 | N*2 |
| 3 | N*2+1 | N*3 |
| ⋮ | ⋮ | ⋮ |
| (M−2) | N*(M−3)+1 | N*(M−2) |
| (M−1) | N*(M−2)+1 | N*(M−1) |
| M | N*(M−1)+1 | O |
O: NUMBER OF IMAGES CONTAINED IN MEDIUM
N: NUMBER OF IMAGES TO BE DISPLAYED PER PAGE
M: TOTAL NUMBER OF PAGES
M IS DETERMINED BY THE FOLLOWING EQUATION:
M = TOTAL NUMBER OF IMAGES+(N−1)/N

[Fig. 11A]
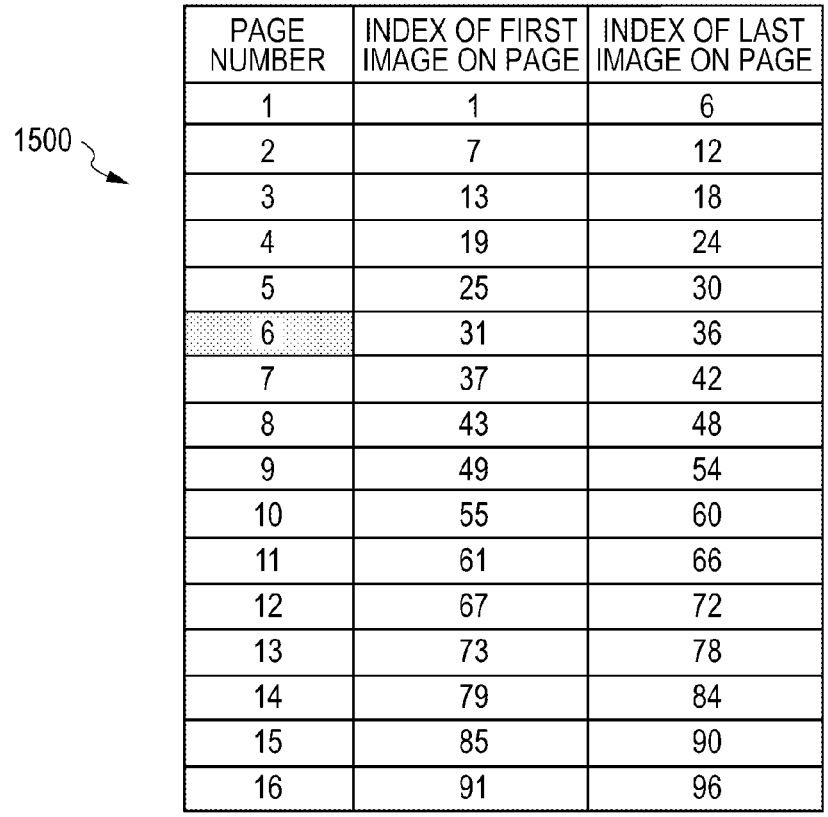
| PAGE NUMBER | INDEX OF FIRST IMAGE ON PAGE | INDEX OF LAST IMAGE ON PAGE |
|---|---|---|
| 1 | 1 | 6 |
| 2 | 7 | 12 |
| 3 | 13 | 18 |
| 4 | 19 | 24 |
| 5 | 25 | 30 |
| 6 | 31 | 36 |
| 7 | 37 | 42 |
| 8 | 43 | 48 |
| 9 | 49 | 54 |
| 10 | 55 | 60 |
| 11 | 61 | 66 |
| 12 | 67 | 72 |
| 13 | 73 | 78 |
| 14 | 79 | 84 |
| 15 | 85 | 90 |
| 16 | 91 | 96 |
 CURRENTLY SELECTED PAGE
[Fig. 11B]
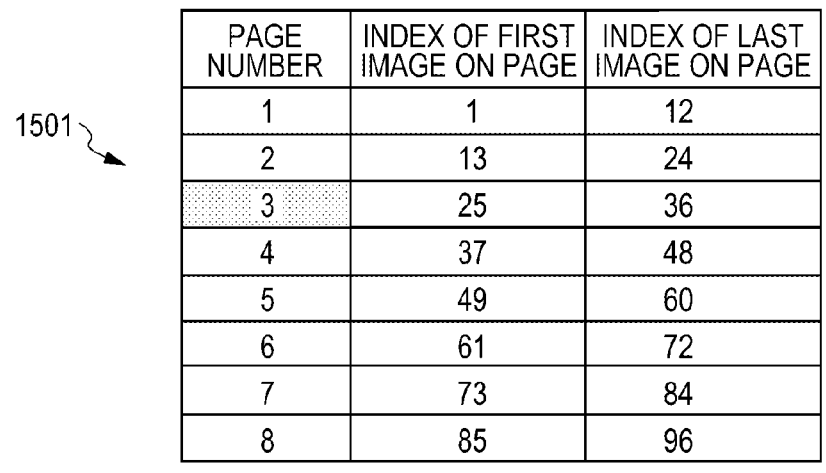
| PAGE NUMBER | INDEX OF FIRST IMAGE ON PAGE | INDEX OF LAST IMAGE ON PAGE |
|---|---|---|
| 1 | 1 | 12 |
| 2 | 13 | 24 |
| 3 | 25 | 36 |
| 4 | 37 | 48 |
| 5 | 49 | 60 |
| 6 | 61 | 72 |
| 7 | 73 | 84 |
| 8 | 85 | 96 |
 CURRENTLY SELECTED PAGE

| PRIORITY | PAGE NUMBER |
|---|---|
| FIRST | 6 |
| SECOND | 1 |
| | 5 |
| | 7 |
| | 16 |
| THIRD | 2 |
| | 4 |
| | 8 |
| | 15 |
| FOURTH | 3 |
| | 9 |
| | 14 |
| FIFTH | 10 |
| | 13 |
| SIXTH | 11 |
| | 12 |

| PRIORITY | PAGE NUMBER |
|---|---|
| FIRST | 3 |
| SECOND | 1 |
| | 2 |
| | 4 |
| | 8 |
| THIRD | 5 |
| | 7 |
| FOURTH | 6 |

[Fig. 13A]

| PRIORITY | PAGE NUMBER | INDEX OF FIRST IMAGE ON PAGE | INDEX OF LAST IMAGE ON PAGE |
|---|---|---|---|
| FIRST | 6 | 31 | 36 |
| SECOND | 1 | 1 | 6 |
| | 5 | 25 | 30 |
| | 7 | 37 | 42 |
| | 16 | 91 | 96 |
| THIRD | 2 | 7 | 12 |
| | 4 | 19 | 24 |
| | 8 | 43 | 48 |
| | 15 | 85 | 90 |
| FOURTH | 3 | 13 | 18 |
| | 9 | 49 | 54 |
| | 14 | 79 | 84 |
| FIFTH | 10 | 55 | 60 |
| | 13 | 73 | 78 |
| SIXTH | 11 | 61 | 66 |
| | 12 | 67 | 72 |

| PRIORITY | PAGE NUMBER | INDEX OF FIRST IMAGE ON PAGE | INDEX OF LAST IMAGE ON PAGE |
|---|---|---|---|
| FIRST | 3 | 25 | 36 |
| SECOND | 1 | 1 | 12 |
| | 2 | 13 | 24 |
| | 4 | 37 | 48 |
| | 8 | 85 | 96 |
| THIRD | 5 | 49 | 60 |
| | 7 | 73 | 84 |
| FOURTH | 6 | 61 | 72 |

1701

[Fig. 14A]
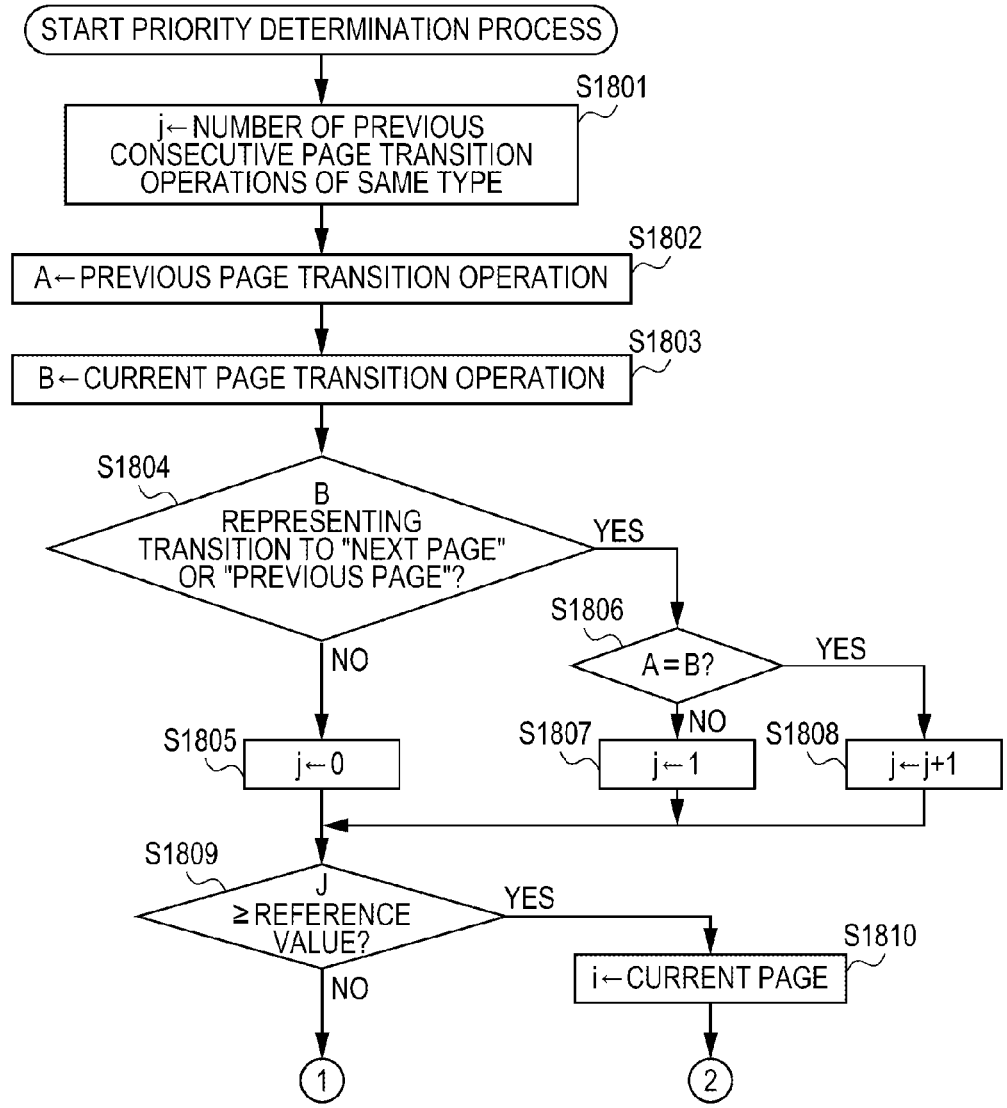

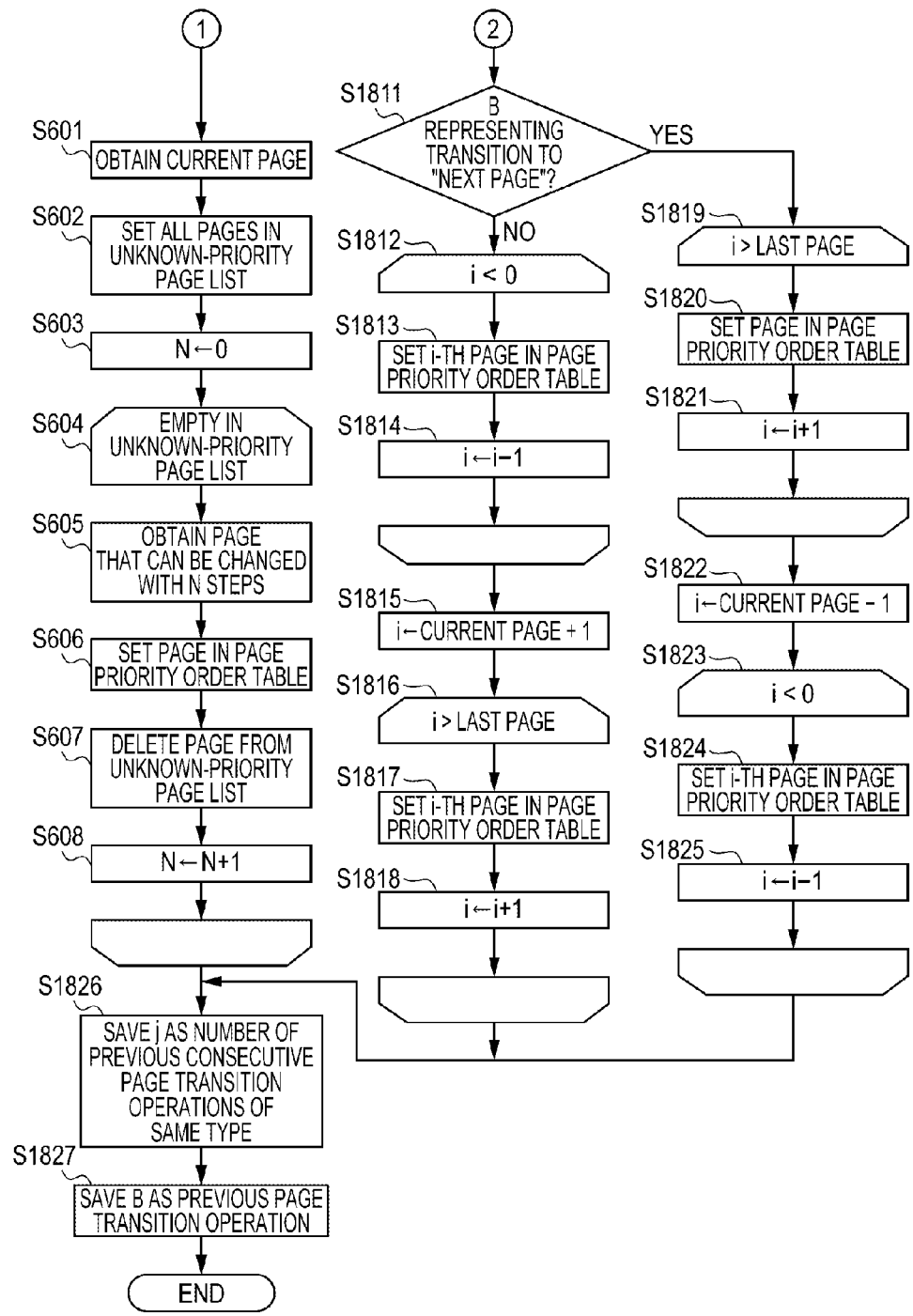

| PRIORITY | PAGE NUMBER |
|---|---|
| FIRST | 6 |
| SECOND | 5 |
| THIRD | 4 |
| FOURTH | 3 |
| FIFTH | 2 |
| SIXTH | 1 |
| SEVENTH | 7 |
| EIGHTH | 8 |
| NINTH | 9 |
| TENTH | 10 |

| PRIORITY | PAGE NUMBER |
|---|---|
| FIRST | 6 |
| SECOND | 7 |
| THIRD | 8 |
| FOURTH | 9 |
| FIFTH | 10 |
| SIXTH | 5 |
| SEVENTH | 4 |
| EIGHTH | 3 |
| NINTH | 2 |
| TENTH | 1 |

[Fig. 16]
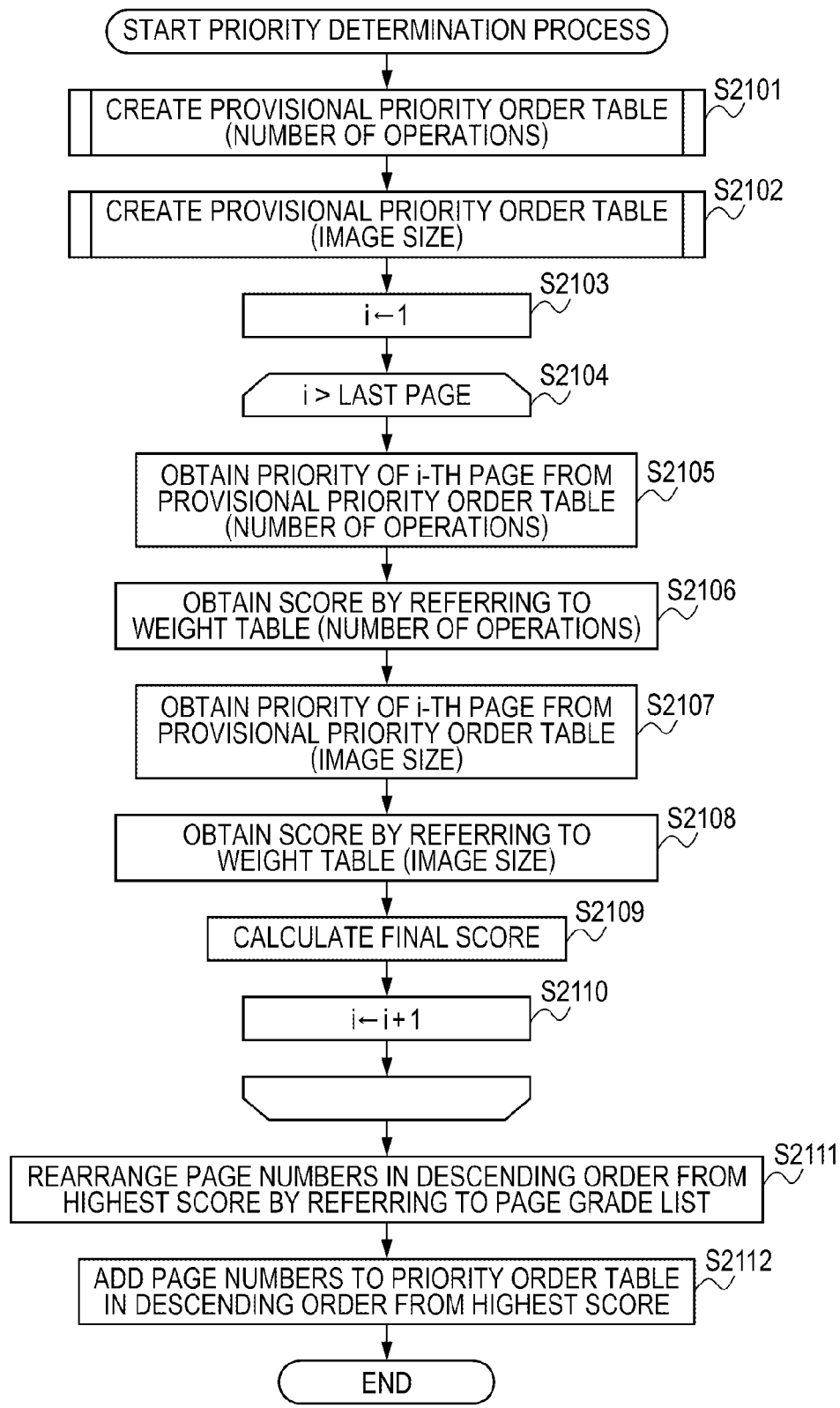

[Fig. 17]
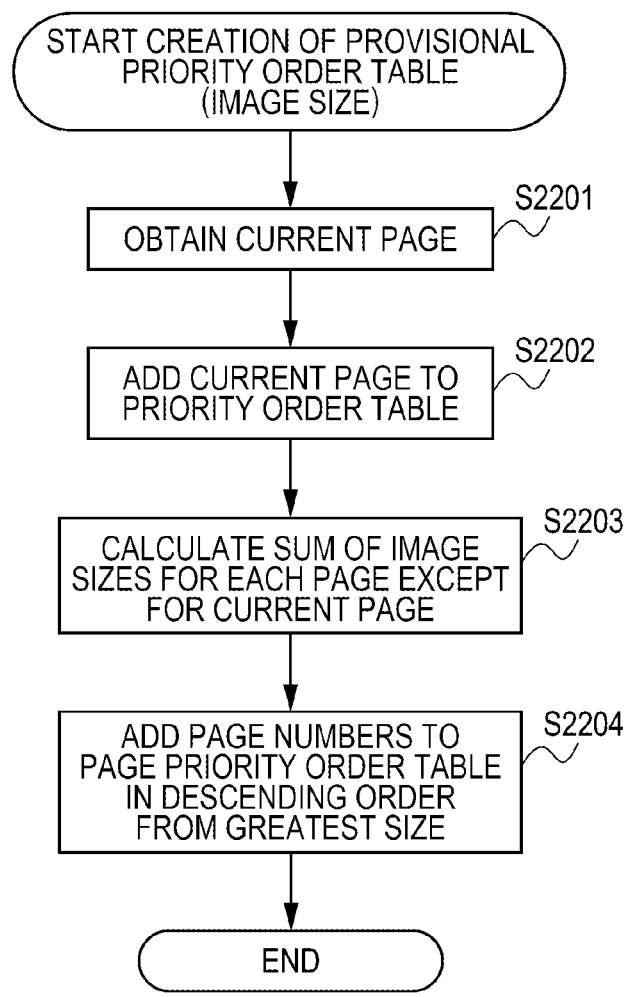

| PRIORITY (NUMBER OF OPERATIONS) | POINT |
|---|---|
| FIRST | 10 |
| SECOND | 7 |
| THIRD | 4 |
| FOURTH | 2 |

| PRIORITY (NUMBER OF OPERATIONS) | POINT |
|---|---|
| FIRST | 10 |
| SECOND | 8 |
| THIRD | 6 |
| FOURTH | 4 |
| FIFTH | 3 |
| SIXTH | 2 |
| SEVENTH | 1 |
| EIGHTH | 0 |

[Fig. 19]

| PAGE NUMBER | PRIORITY (NUMBER OF OPERATIONS) | PRIORITY (IMAGE SIZE) | SCORE |
|---|---|---|---|
| 1 | SECOND | FIFTH | 10 |
| 2 | THIRD | SIXTH | 6 |
| 3 | FIRST | FIRST | 20 |
| 4 | SECOND | SECOND | 15 |
| 5 | THIRD | FOURTH | 8 |
| 6 | FOURTH | THIRD | 8 |
| 7 | THIRD | SEVENTH | 5 |
| 8 | SECOND | EIGHTH | 7 |

| PRIORITY | PAGE NUMBER |
|---|---|
| FIRST | 3 |
| SECOND | 4 |
| THIRD | 1 |
| FOURTH | 5 |
| FOURTH | 6 |
| FIFTH | 8 |
| SIXTH | 2 |
| SEVENTH | 7 |

STORAGE MEDIUM SUCH AS FD/CD-ROM

| DIRECTORY INFORMATION |
|---|
| FIRST DATA PROCESSING PROGRAM<br>PROGRAM CODES CORRESPONDING TO STEPS OF FLOWCHART OF FIG. 5 |
| SECOND DATA PROCESSING PROGRAM<br>PROGRAM CODES CORRESPONDING TO STEPS OF FLOWCHART OF FIG. 6 |
| THIRD DATA PROCESSING PROGRAM<br>PROGRAM CODES CORRESPONDING TO STEPS OF FLOWCHART OF FIG. 9 |
| FOURTH DATA PROCESSING PROGRAM<br>PROGRAM CODES CORRESPONDING TO STEPS OF FLOWCHART OF FIG. 14 |
| FIFTH DATA PROCESSING PROGRAM<br>PROGRAM CODES CORRESPONDING TO STEPS OF FLOWCHART OF FIG. 16 |
| SIXTH DATA PROCESSING PROGRAM<br>PROGRAM CODES CORRESPONDING TO STEPS OF FLOWCHART OF FIG. 17 |

IMAGE PROCESSING APPARATUS, IMAGE PROCESSING METHOD, AND STORAGE MEDIUM STORING IMAGE PROCESSING PROGRAM

TECHNICAL FIELD

The present invention relates to a technique for enabling an image processing apparatus capable of displaying image data captured using a digital camera or the like to efficiently read image data from a recording medium storing image data.

BACKGROUND ART

With the recent prevalence of digital cameras, it has become common to save photographed images in the form of digital data in media such as Secure Digital (SD) cards or Compact Flash (registered trademark) cards and to read image data from the media, as necessary, so that an image can be displayed on a monitor mounted in a personal computer or the image data can be output using a printing device to produce a photograph.

In this situation, a service for printing image data captured using a digital camera (hereinafter referred to as a "digital photograph printing service") has been provided mainly in camera stores, photo studios, drug stores, or other stores. In the digital photograph printing service, generally, two methods are available for ordering photographic prints: placing a print order using a personal computer at home via the Internet, and bringing a medium to a service providing store and placing a print order using a dedicated reception terminal.

In the method of ordering photographic prints via the Internet, a user can place an order at any time at home.

In the method of ordering photographic prints using a dedicated reception terminal, on the other hand, due to the limitation on the number of reception terminals installed in a store, a user may wait to place an order until any reception terminal becomes available when all the reception terminals are occupied by other users. In order to improve the productivity of the photograph printing service, there is a method of increasing the number of reception terminals or reducing the time for one user to use a reception terminal. However, the increase in the number of reception terminals is costly and a certain amount of space is required to install a reception terminal. Therefore, it is more effective to reduce the time for one user to use a reception terminal, that is, the time involved per order.

In the latter method of ordering photographic prints, the order placement process is generally performed on a reception terminal using the following flow:

Operation Procedure 1: A user inserts a medium into the reception terminal.

Operation Procedure 2: Image data is read from the inserted medium.

Operation Procedure 3: The read image data is displayed as a list of images on a screen (hereinafter referred to as an "image selection screen").

Operation Procedure 4: The user selects an image to be ordered to obtain a photographic print on the image selection screen.

Operation Procedure 5: After the selection, the user presses a "Place Order" button, and the order can be received.

When the read image data is displayed as a list of images in Operation Procedure 3, each image to be displayed needs to have a sufficient size to allow the user to specify an image. In addition, due to the limitation on the size of the display monitor on which the image selection screen is displayed, it is difficult to display all the images read from the medium at the same time. Therefore, it is common to group a certain number of images (a group of images is hereinafter referred to as a "page") and to display images for one page on the image selection screen at the same time so that in Operation Procedure 4, the user can select an image while switching pages.

The order in which pages and images to be displayed on the image selection screen are arranged is generally defined in advance. Specifically, pages and images are displayed in order from the earliest photographing time or in order from the latest photographing time.

In recent years, due to the prevalence of digital cameras and the advent of large-capacity media, the amount of image data to be saved in the media has tended to increase. Thus, it is desirable to provide a method for reducing the time required to place an order and increasing the speed of reading image data desired by a user to help the user select an image.

PTL 1 discloses a technique in which when an instruction for changing a page to be displayed is issued by a user at a time prior to the completion of the reading of image data to be displayed on the page, image data corresponding to the top image on the specified page is preferentially read to quickly display images of image data.

CITATION LIST

Patent Literature

PTL 1: Japanese Patent Laid-Open No. 2005-269077

DISCLOSURE OF INVENTION

Technical Problem

However, the size of image data has increased along with an increase in the image quality of digital cameras, and the amount of image data has also increased due to the large capacity of media. Therefore, it is difficult to quickly change a page to be displayed if a user starts to read image data on a page to be displayed to find a desired page, in the manner disclosed in PTL 1, after the user gives an instruction for changing the page.

Furthermore, the user may not always browse through pages over and over according to the order of the pages to find a required image from a large amount of image data.

In PTL 1, upon completion of the reading of all pieces of image data on a specified page, the reading of image data on the page subsequent to the specified page is started.

When the user specifies a page other than the subsequent page, which is not preferentially read, it is necessary to read image data on the specified page again from the top image on the page.

Therefore, the technique disclosed in PTL 1 is not beneficial for a user who does not specify pages in accordance with the order of the pages to reduce the image display time.

Solution to Problem

The present invention provides a mechanism capable of displaying images on a desired page immediately after a user gives a page change instruction.

According to an aspect of the present invention, there is provided an image processing apparatus including a reading unit configured to read image data recorded on a recording medium; a display unit configured to display one or more images corresponding to the image data read by the reading unit; a number-of-images determination unit configured to determine the number of images that are displayable at the same time on the display unit to obtain the number of images per page; a page allocation unit configured to allocate pages to be displayed to the image data recorded on the recording medium in accordance with the number of images obtained by the number-of-images determination unit; a determination unit configured to determine priorities of the pages for which the image data is read by the reading unit; and a page specifying unit configured to be operated by a user to specify a page to be displayed on the display unit. The determination unit determines the priorities of the pages based on information about a page that can be specified by the page specifying unit. The reading unit starts to read image data for a desired page from the recording medium in accordance with a result obtained by the determination unit without waiting for the user to operate the page specifying unit.

Advantageous Effects of Invention

According to the present invention, before a user gives a page change instruction, image data on a page to be displayed next can be preferentially read, thereby facilitating the display of an image on the desired page immediately after the page change instruction is issued.

Therefore, the occupying time of a reception terminal can be reduced, and an improvement in the productivity of the photograph printing service can be realized.

Further features of the present invention will become apparent from the following description of exemplary embodiments with reference to the attached drawings.

BRIEF DESCRIPTION OF DRAWINGS

FIG. 1 is a block diagram describing an image processing apparatus (minilab system) in the digital photograph printing service, which may be an implementation of an information processing apparatus according to an embodiment of the present invention.

FIG. 2 is a block diagram describing a configuration of a reception terminal according to an embodiment of the present invention.

FIG. 3 is a diagram illustrating an image reading start screen on an order receiving application operating on the reception terminal according to the embodiment of the present invention.

FIG. 4 is a diagram illustrating a first image selection screen on the order receiving application operating on the reception terminal according to the embodiment of the present invention.

FIG. 5 is a flowchart illustrating an example of a first data processing procedure performed in an information processing apparatus according to the present invention.

FIG. 6 is a flowchart illustrating an example of a second data processing procedure performed in the information processing apparatus according to the present invention.

FIG. 7A is a diagram illustrating a first priority order table created using the order receiving application according to the present invention.

FIG. 7B is a diagram illustrating a second priority order table created using the order receiving application according to the present invention.

FIG. 7C is a diagram illustrating a third priority order table created using the order receiving application according to the present invention.

FIG. 7D is a diagram illustrating a fourth priority order table created using the order receiving application according to the present invention.

FIG. 7E is a diagram illustrating a fifth priority order table created using the order receiving application according to the present invention.

FIG. 8 is a diagram illustrating a second image selection screen on the order receiving application operating on the reception terminal according to the embodiment of the present invention.

FIG. 9 is a flowchart illustrating an example of a third data processing procedure performed in the information processing apparatus according to the present invention.

FIG. 10 is a diagram illustrating an example of an image allocation template for the order receiving application according to the present invention.

FIG. 11A is a diagram illustrating an example of a first image allocation table created using the order receiving application according to the present invention.

FIG. 11B is a diagram illustrating an example of the first image allocation table created using the order receiving application according to the present invention.

FIG. 12A is a diagram illustrating an example of a sixth priority order table created using the order receiving application according to the present invention.

FIG. 12B is a diagram illustrating an example of the sixth priority order table created using the order receiving application according to the present invention.

FIG. 13A is a diagram describing the connection between a priority order table and an image allocation table that are created using the order receiving application according to the present invention.

FIG. 13B is a diagram describing the connection between the priority order table and the image allocation table that are created using the order receiving application according to the present invention.

FIG. 14A is a flowchart illustrating an example of a fourth data processing procedure performed in the information processing apparatus according to the present invention.

FIG. 14B is a flowchart illustrating the example of the fourth data processing procedure performed in the information processing apparatus according to the present invention.

FIG. 15A is a diagram illustrating a seventh priority order table created using the order receiving application according to the present invention.

FIG. 15B is a diagram illustrating an eighth priority order table created using the order receiving application according to the present invention.

FIG. 16 is a flowchart illustrating an example of a fifth data processing procedure performed in the information processing apparatus according to the present invention.

FIG. 17 is a flowchart illustrating an example of a sixth data processing procedure performed in the information processing apparatus according to the present invention.

FIG. 18A is a diagram illustrating a first weight table for the order receiving application according to the present invention.

FIG. 18B is a diagram illustrating a second weight table for the order receiving application according to the present invention.

FIG. 19 is a diagram illustrating an example of a page grade table created using the order receiving application according to the present invention.

FIG. 20 is a diagram illustrating an example of a ninth priority order table created using the order receiving application according to the present invention.

FIG. 21 is a diagram describing a memory map of a storage medium storing various data processing programs that can be read by the information processing apparatus according to the present invention.

DESCRIPTION OF EMBODIMENTS

The present invention will be described hereinafter with reference to the drawings.

First Embodiment

System Configuration

Embodiments of the present invention will now be described with reference to the drawings.

First, an example of a photofinishing laboratory system (hereinafter referred to as a "minilab system") 100 for providing the digital photograph printing service to allow a user to order printing of an image and to print the image in a system including an image processing apparatus according to a first embodiment of the present invention will be described with reference to FIG. 1.

Referring to FIG. 1, the minilab system 100 includes a medium reading device 101, a reception terminal 102 serving as an image processing apparatus, a transmission path 103, an order management terminal 104, a transmission path 105, and a printer 106.

A user who wishes to order photographic prints inserts a medium 108 storing image data 107 into the medium reading device 101 that is connected to the reception terminal 102 serving as an image processing apparatus. The reception terminal 102 reads the image data 107 stored in the medium 108, and displays images on a display device mounted in the reception terminal 102. The user selects images to be ordered from among the displayed images. Upon receipt of an order instruction from the user, the reception terminal 102 generates order information 109. Then, the reception terminal 102 transfers the order information 109 to the order management terminal 104 via the transmission path 103. The order information 109 includes the number of images, image data, file names, and the host name of the reception terminal 102, and other suitable information. Upon receipt of the order information 109, the order management terminal 104 performs image correction on the image data included in the order information 109, as required, and then converts the order information 109 into data (print data 110) in the format that can be interpreted by the printer 106 in response to a printing instruction from an operator. Then, the order management terminal 104 transfers the print data 110 to the printer 106 via the transmission path 105.

The printer 106 analyzes the print data 110, and outputs the image data as photographs 111.

The configuration and operation of an order receiving terminal 200 according to the present embodiment will now be specifically described.

Overall Configuration of Order Receiving Terminal

Referring to FIG. 2, the order receiving terminal 200 (corresponding to the reception terminal 102 illustrated in FIG. 1) is configured such that a host computer 201 is connected to a hard disk device 202, a display device 203, a data input device 204, a medium reading device 101, and a communication control device 205.

In FIG. 2, portions similar to those of FIG. 1 are assigned the same numerals, and will not be discussed herein.

The host computer 201 executes a predetermined system program to control and monitor the overall operation of the order receiving terminal 200.

Specifically, for example, the host computer 201 has a computer function including a central processing unit (CPU), a random access memory (RAM), and a read-only memory (ROM), which are arranged on a system board, as described below. The CPU of the host computer 201 reads and executes a required processing program from an internal memory thereof, the hard disk device 202, which is provided outside the host computer 201, or the like, as required, to control the overall operation of the order receiving terminal 200.

Here, various programs executed by the host computer 201 are stored in the hard disk device 202, by way of example. The hard disk device 202 stores processing programs for implementing operations in the present embodiment.

The processing programs (program code) for implementing the operations in the present embodiment may be stored in a device other than the hard disk device 202 or the internal memory.

In the present embodiment, furthermore, an operating system (OS) of the host computer 201 is implemented using, for example, "Windows (registered trademark)". However, any other OS may be used.

In response to an instruction from the host computer 201 by executing a system program, an application program, or the like, the display device 203 displays a predetermined window under the management of the OS.

The data input device 204 includes a keyboard, a mouse, a touch panel, and any other pointing device, and is configured to receive various instructions given by a user and to transmit the instructions to the host computer 201. For example, the data input device 204 transmits order information about an item selected by a user using the touch panel to the host computer 201.

The communication control device 205 may be a connection interface for connecting, for example, the order receiving terminal 200 to an external network so that they can communicate with each other. In the present embodiment, the communication control device 205 is connected to the order management terminal 104 illustrated in FIG. 1.

Overall Configuration of Order Receiving Application

Software operating on the order receiving terminal 200 and configured to receive an order (hereinafter referred to as an "order receiving application") is configured using an image data reading start screen 300 illustrated in FIG. 3 and an image selection screen 400 illustrated in FIG. 4. The image data reading start screen 300 allows a user to issue an instruction to start reading image data. The image selection screen 400 is configured to display a list of thumbnails of image data contained in a medium so that a user can select a desired image (photograph).

While in the present embodiment, the order receiving application is configured using the image data reading start screen 300 and the image selection screen 400, any other configuration may be used.

Explanation of Image Data Reading Start Screen

The image data reading start screen 300 prompts a user to insert the medium 108 into the medium reading device 101. When the user inserts the medium 108 into the medium reading device 101 and then presses an image data reading start button 301, the image data 107 contained in the medium 108 is read into the hard disk device 202 or the internal memory of the host computer 201. Then, the image data reading start screen 300 transitions to the image selection screen 400.

A configuration for automatically starting to read image data in response to the detection of medium insertion when a user inserts the medium 108 into the medium reading device 101 may also be used. In this configuration, the image data reading start button 301 may not necessarily be displayed.

First Example of Image Selection Screen

The image selection screen 400 includes an operation area and a detail display area 410.

In the operation area, thumbnail images for one page can be displayed to allow a user to select an image. For example, in a configuration in which the number of images that are displayable at the same time is set to six so that six images can be displayed per page, the first six images among the images read from the medium 108 are displayed on the first page in accordance with a predefined arrangement order. The number of images that are displayable at the same time may be determined in advance on a system or may be specified by a user.

The operation area includes an image selection area 401, a "Select One Print For All Images" button 402, a "Reset Selection" button 403, buttons for allowing a user to specify a desired page, including a "Top Page" button 404, a "Previous Page" button 405, a "Next Page" button 406, and a "Last Page" button 407, a current-page display area 408, and a "Place Order" button 409.

The image selection area 401 includes a file name display area 411, a thumbnail area 412, a plus (+) button 413, a minus (−) button 414, and a number-of-prints-ordered display area 415. The file name display area 411 may be an area for displaying the file name of image data. The thumbnail area 412 may be an area for displaying the thumbnail of the image data. The plus (+) button 413 and the minus (−) button 414 may be buttons for setting the number of prints of the corresponding image to be ordered. The plus (+) button 413 can be used to increase, by one, the number of prints of the corresponding image being ordered. The minus (−) button 414 can be used to reduce, by one, the number of prints of the corresponding image being ordered. The number-of-prints-ordered display area 415 may be an area for displaying the set number of prints being ordered.

The "Select One Print For All Images" button 402 and the "Reset Selection" button 403 may be buttons for collectively setting the numbers of prints of all the images. The "Select One Print For All Images" button 402 can be used to set the number of prints of all the images to one. The "Reset Selection" button 403 can be used to reset the number of prints of all the images.

The "Top Page" button 404, the "Previous Page" button 405, the "Next Page" button 406, and the "Last Page" button 407 may be buttons used for page transitions. The "Top Page" button 404 can be used to display the top page. The "Previous Page" button 405 can be used to display the page previous to the currently displayed page. The "Next Page" button 406 can be used to display the page next to the currently displayed page. The "Last Page" button 407 can be used to display the last page.

The detail display area 410 provides a preview display of the last selected image.

First Image Data Reading Process

The order receiving application according to the present invention makes use of the time during which a user is selecting an image using the image selection screen 400, and reads in advance image data for a page that will possibly be displayed by a page change. The order of pages for which the image data is read may be determined using a priority order table described below. When a page to be displayed is changed by a user operation, the priorities of the pages for the image data to be read are determined again.

FIG. 5 is a flowchart illustrating an exemplary processing procedure for reading image data using the order receiving application according to the present invention. The processing of steps S501 to S509 is implemented by loading a control program from an external storage device or the like into a memory and executing the control program by using the CPU of the host computer 201.

In step S501, the order receiving application obtains the total number of images of image data.

Then, in step S502, the order receiving application sets the number of images to be displayed per page. The number of images to be displayed per page is set to, for example, six. Here, the number of images to be displayed per page is represented by N.

Then, in step S503, the order receiving application calculates the total number of pages on the basis of the number of images and the number of images to be displayed per page. The order receiving application also allocates a page to each of the images.

Then, in step S504, the order receiving application performs a priority determination process described below to create a priority order table.

Then, in step S505, the order receiving application starts to read image data in order, starting from image data for a high-priority page, on the basis of the priority order table created in step S504, without waiting for the user to give an instruction for specifying a page to be displayed.

Then, in step S506, the order receiving application detects an event that occurs when an operation instruction is given by a user on the image selection screen 400.

Then, in step S507, the order receiving application determines whether or not the event obtained in step S506 is a page change operation.

If the order receiving application determines that the event is a page change operation, the process proceeds to step S508. If the order receiving application determines that the event is not a page change operation, the process returns to step S506.

In step S508, the order receiving application creates a priority order table that reflects the page change.

Then, in step S509, the order receiving application reads images in order, starting from image data for a high-priority page among image data that has not yet been read, on the basis of the priority order table created in step S508.

First Priority Determination Process

In the present embodiment, priorities are calculated and determined on the basis of the result of counting the number of user operations required to change the currently displayed page to the page to be subsequently displayed.

Specifically, if the number of operations required to display a desired page is small, it is determined that the possibility that the page will be displayed immediately is high, and a higher priority is assigned to a page that requires a smaller number of operations to display the page.

FIG. 6 is a flowchart illustrating an exemplary processing procedure for creating a priority order table. The processing of steps S601 to S608 is implemented by loading a control program from an external storage device or the like into a memory and executing the control program by using the CPU of the host computer 201.

In step S601, the order receiving application obtains the page number of a page currently being displayed.

Then, in step S602, the order receiving application adds all the page numbers to an unknown-priority list described below. The unknown-priority list may be a list of page numbers that have not yet been determined.

In step S603, the counted value indicating the number of processes is set to 0.

Then, in step S605, the order receiving application obtains the number of a page that can be changed from the current page with N steps.

In step S606, the counted value indicating the number of processes is updated.

In step S606, then, the order receiving application adds the obtained page number to the priority order table.

Then, in step S607, the order receiving application deletes the page number added to the priority order table from the unknown-priority list.

Then, the order receiving application repeats the processing of steps S605 to S608 until the unknown-priority list becomes empty.

First Example of Priority Order Table

A procedure for creating a priority order table for a total of 60 images, six images to be displayed per page, and the sixth page currently being displayed will be described.

In step S602, the unknown-priority list is changed to an unknown-priority list 702 illustrated in FIG. 7A. At this time, a priority order table 701 illustrated in FIG. 7A is obtained.

In the following description, the sixth page is currently being displayed, by way of example. When the value N is 0, in step S605, the current page, namely, the page with page number 6, is obtained. In steps S606 and S607, the priority order table and the unknown-priority list are changed to a priority order table 801 and an unknown-priority list 802 illustrated in FIG. 7B, respectively.

When the value N is 1, in step S606, a page that can be changed from the current page with one step is obtained. That is, pages that can be changed with one step using the "Top Page" button 404, the "Previous Page" button 405, the "Next Page" button 406, and the "Last Page" button 407 are the first page, the fifth page, the seventh page, and the tenth page. In steps S606 and S607, the priority order table and the unknown-priority list are changed to a priority order table 901 and an unknown-priority list 902 illustrated in FIG. 7C, respectively.

Similarly, when the value N is 2, the priority order table and the unknown-priority list are changed to a priority order table 1001 and an unknown-priority list 1002 illustrated in FIG. 7D, respectively.

Similarly, when the value N is 3, a priority order table 1101 and an unknown-priority list 1102 illustrated in FIG. 7E are obtained.

On the basis of the priority order table 1101, images are read in order, starting from image data for a high-priority page among image data that has not yet been read.

When a user performs the operation of changing a page during the reading of image data, the tables are created again at an appropriate time, and the reading of image data is started again from a high-priority page.

According to the present embodiment, therefore, before a user gives an instruction for changing a page, an image on a page to be displayed next is preferentially read in advance, by making use of the time during which the user is selecting an image, in accordance with a table that is created on the basis of the number of operation procedures. Therefore, immediately after an instruction for changing a page has been given, an image for the corresponding page can be displayed.

Second Embodiment

The first embodiment provides a configuration in which priorities for image data to be read are determined on the basis of the number of user operations required to display each page from the page currently being displayed, and in which image data can be read accordingly. In the configuration, furthermore, when the user performs the operation of changing a page, priorities that reflect the page change are assigned again, and the image data can be read accordingly.

In the first embodiment, the number of images to be displayed per page is set in advance, thereby uniquely determining the total number of pages in accordance with the number of images of image data contained in a medium inserted. Furthermore, once the number of images of the image data contained in the medium is counted before the image data is read, the page with which each of the images of the image data is associated can be uniquely determined. Therefore, with a configuration in which a priority order table is generated again and the priorities for the image data to be read is changed only when a user performs the operation of changing a page, the waiting time for reading the image data can be reduced.

Meanwhile, since the number of images to be displayed per page is fixed, the display size of the images are also fixed accordingly. Therefore, some users may feel that the size of images to be displayed is too small, and it may be difficult for such users to select an image to be printed. Other users do not feel uncomfortable about the size of images to be displayed, but may feel that the number of images to be displayed per page is small and feel bothered by the frequent changes of pages.

Accordingly, a second embodiment of the present invention provides a configuration for allowing a user to change the number of images to be displayed per page in accordance with his/her preference. In the configuration, furthermore, an image on a page to be displayed next is preferentially read in advance, by making use of the time during which the user is selecting an image. Therefore, immediately after an instruction for changing a page has been given, an image for the corresponding page can be displayed.

In the second embodiment, portions that are common to those in the first embodiment will not be discussed herein. In the preset embodiment, a screen illustrated in FIG. 8 in place of the image selection screen 400 illustrated in FIG. 4 is used and a process illustrated in FIG. 9 in place of that illustrated in FIG. 5 is executed.

Second Example of Image Selection Screen

An image selection screen according to the present embodiment has a function for changing the number of images to be displayed per pages. Specifically, in an example of an image selection screen 1200 illustrated in FIG. 8, a user can use a combo box 1201 to set the number of images to be displayed per page to "6" or "12".

Second Image Data Reading Process

FIG. 9 is a flowchart illustrating an exemplary processing procedure for reading image data using the order receiving application according to the present invention. The processing of steps S501 to S509 and S1301 to S1307 is implemented by loading a control program from an external storage device or the like into a memory and executing the control program by using the CPU of the host computer 201.

In FIG. 9, processing steps similar to that of FIG. 5 in the first embodiment are assigned the same step numbers, and will not be discussed herein.

In step S1301, the order receiving application obtains the number of images to be displayed per page.

In step S1302, the order receiving application determines whether or not the event obtained in step S506 is the operation of changing the number of images to be displayed.

If the order receiving application determines that the event is the operation of changing the number of images to be displayed, the process retunes to step S1303. If the order receiving application determines that the event is not the operation of changing the number of images to be displayed, the process proceeds to step S507.

In step S1303, the order receiving application obtains the number of images to be displayed per page.

Then, in step S1304, the order receiving application calculates the total number of pages on the basis of the number of images and the number of images to be displayed per page.

Then, in step S1305, the order receiving application refers to an image allocation template 1400 illustrated in FIG. 10, which will be described in detail below, and creates an image allocation table in which each piece of image data is associated with a page.

Then, in step S1306, the order receiving application obtains the index of the image currently being displayed in the detail display area 410 (i.e., the last selected image).

Then, in step S1307, the order receiving application obtains, based on the index of the image obtained in step S1306 and the image allocation table created in step S1305, a page with which the index of the image is associated, and sets the page as the current page.

In step S509, the order receiving application reads images in order, starting from image data for a high-priority page among image data that has not yet been read, on the basis of the priority order table created in step S508 and the image allocation table created in step S1305.

Image Allocation Table

FIG. 10 illustrates an example of the image allocation template 1400 in which individual images are associated with pages.

The image allocation template 1400 has a function for determining image data to be allocated to each page on the basis of the number of images to be displayed per page and the total number of images.

An image allocation table 1500 illustrated in FIG. 11A may be an example of an image allocation table that is created when the number of images to be displayed per page is six.

In accordance with a predefined arrangement order, the image data for the first six images (INDEX 1 to INDEX 6) is associated with the first page.

An image allocation table 1501 illustrated in FIG. 11B may be an example of an image allocation table that is created when the number of images to be displayed per page is 12.

In accordance with a predefined arrangement order, the image data for the first 12 images (INDEX 1 to INDEX 12) is associated with the first page.

Second Example of Priority Order Table

A procedure for creating a priority order table for a total of 96 images, six images to be displayed per page, and the sixth page currently being displayed, when the number of images to be displayed per page is changed from six to 12, will be described.

A priority order table 1600 illustrated in FIG. 12A may be a priority order table that is held before the number of images to be displayed per page is changed from six to 12.

Here, when the number of images to be displayed per page is changed from six to 12 using the combo box 1201 illustrated in FIG. 8, the order receiving application executes the process illustrated in FIG. 9.

In this process, in step S1305, the image allocation table 1501 described above is created.

Further, in step S1307, the order receiving application refers to the image allocation table 1501 to determine a page with which the index of the image being displayed in the detail display area 410 is associated, and sets the page as the current page obtained after the number of images to be displayed per page is changed to 12. For example, when the index of the image being displayed in the detail display area 410 is 31, "Page 3" is set as the current page obtained after the number of images to be displayed per page is changed to 12.

Then, in step S508, a priority order table 1601 illustrated in FIG. 12B is created on the basis of the current page ("Page 3") set in step 1307.

FIGS. 13A and 13B are diagrams describing the connection between a priority order table and an image allocation table. FIG. 13A illustrates a priority order table 1700 before the number of images to be displayed per page is changed, and FIG. 13B illustrates a priority order table 1701 after the number of images to be displayed per page is changed. It can be understood that the image data having the first priority in the priority order table 1701 includes image data for the sixth page having the first priority and the image data for the fifth page having the second priority in the priority order table 1700.

Therefore, the present embodiment provides a configuration for allowing a user to change the number of images to be displayed per page in accordance with his/her preference. Page allocation results based on the number of images to be displayed per page before the change and page allocation results based on the number of images to be displayed per page after the change are obtained and are associated with each other. This enables continuation of the process of preferentially reading in advance an image on a page to be displayed next, by making use of the time during which a user is selecting an image. Therefore, immediately after an instruction for changing a page has been given, an image for the corresponding page can be displayed.

Third Embodiment

The first embodiment provides a configuration in which priorities for image data to be read are determined on the basis of the number of user operations required to display each page from the page currently being displayed, and in which image data can be read accordingly.

When the user repeats the same type of page transition, in some cases, it may not be sufficiently effective to only determine priorities for image data to be read on the basis of the number of user operations required to display each page from the page currently being displayed.

For example, it is assumed that a user repeatedly performs page transitions in turn from the top page by using only a "Next Page" button. If a high priority is set for a page that requires a user to perform a small number of operations until the page is displayed from the currently displayed page, the page having the next highest priority relative to the currently displayed page may be the "next page" or the "last page". However, in the process of repeatedly performing page transitions in turn from the top page, the last page is displayed later than the other pages. That is, the image data for the last page may be read after the image data for the other pages has been read, and there is no need to set a high priority for the last page. Furthermore, reading the image data for the last page before the image data for the other pages is read may postpone the opportunity to read the image data for the other pages, which may not necessarily be desirable in the context of the implementations of the present invention.

Accordingly, a third embodiment of the present invention provides a configuration in which even in a case where the same type of page transition is performed consecutively a certain number of times or more, an image on a page to be displayed next is preferentially read in advance, by making use of the time during which a user is selecting an image, whereby immediately after an instruction for changing a page has been given, an image for the corresponding page can be displayed.

In the third embodiment, portions that are common to those in the first embodiment will not be discussed herein. In the preset embodiment, a process illustrated in FIGS. 14A and 14B in place of that illustrated in FIG. 6 is executed.

Second Priority Determination Process

FIGS. 14A and 14B are a flowchart illustrating an exemplary processing procedure for creating a priority order table. The processing of steps S1801 to S1827 is implemented by loading a control program from an external storage device or the like into a memory and executing the control program by using the CPU of the host computer 201.

In FIGS. 14A and 14B, processing steps similar to those of FIG. 6 in the first embodiment are assigned the same step numbers, and will not be discussed herein.

In step S1801, the order receiving application obtains the number of previous consecutive page transition operations of the same type. In FIGS. 14A and 14B, j denotes the number of consecutive page transition operations of the same type.

Then, in step S1802, the order receiving application obtains the previous page transition operation. In FIGS. 14A and 14B, A denotes the previous page transition operation.

Then, in step S1803, the order receiving application obtains the current page transition operation. In FIGS. 14A and 14B, B denotes the current page transition operation.

Then, in step S1804, the order receiving application determines whether or not the current page transition operation is the transition to the "next page" or the "previous page".

If the order receiving application determines that the current page transition operation is the transition to the "next page" or the "previous page", the process proceeds to step S1806. If the order receiving application determines that the operation is not the transition to the "next page" or the "previous page", the process proceeds to step S1805.

In step S1805, the order receiving application initializes the number of consecutive page transition operations of the same type to 0.

In step S1806, the order receiving application determines whether or not the current page transition operation is the same as the previous page transition operation.

If the order receiving application determines that the current page transition operation is the same as the previous page transition operation, the process proceeds to step S1808. If the order receiving application determines both are not the same, the process proceeds to step S1807.

In step S1807, the order receiving application sets the number of consecutive page transition operations of the same type to 1.

In step S1808, the order receiving application increases the number of consecutive page transition operations of the same type by one.

Then, in step S1809, the order receiving application determines whether or not the counted number of consecutive page transition operations of the same type is equal to or greater than a predetermined reference value. For example, if the reference value is 3 and the transition to the "next page" has been performed consecutively three times, the order receiving application predicts that the next page transition operation will possibly be the transition to the "next page" which is the same as the previous operation.

If the order receiving application determines that the number of consecutive page transition operations of the same type is equal to or greater than the predetermined reference value, the process proceeds to step S1810. If the order receiving application determines otherwise, the process proceeds to step S601.

In step S1810, the order receiving application sets the current page to a variable (hereafter referred to as "variable i") for holding a page number.

Then, in step S1811, the order receiving application determines whether or not the current page transition operation is the transition to the "next page".

If the order receiving application determines that the current page transition operation is the transition to the "next page", the process proceeds to step S1819. If the order receiving application determines that the operation is not the transition to the "next page", the process proceeds to step S1812.

In step S1812, the order receiving application repeats the processing of steps S1813 to S1814 described below until the variable i becomes less than 0.

In step S1813, the order receiving application adds the i-th page to the priority order table.

Then, in step S1814, the order receiving application sets the variable i to the value of the page previous to the i-th page.

Then, in step S1815, the order receiving application sets the variable i to the value of the page subsequent to the current page.

Then, in step S1816, the order receiving application repeats the processing of steps S1817 to S1818 described below until the variable i becomes greater than the value of the last page.

Then, in step S1817, the order receiving application adds the i-th page to the priority order table.

Then, in step S1818, the order receiving application sets the variable i to the value of the page subsequent to the i-th page.

When the process proceeds to step S1819 according to the result of the determination of step S1811, the order receiving application repeats the processing of steps S1820 to S1821 described below until the variable i becomes greater than the value of the last page.

In step S1820, the order receiving application adds the i-th page to the priority order table.

Then, in step S1821, the order receiving application sets the variable i to the value of the page subsequent to the i-th page.

Then, in step S1822, the order receiving application sets the variable i to the value of the page previous to the current page.

Then, in step S1823, the order receiving application repeats the processing of steps S1824 to S1825 described below until the variable i becomes less than 0.

In step S1824, the order receiving application adds the i-th page to the priority order table.

Then, in step S1825, the order receiving application sets the variable i to the value of the page previous to the current, i-th page.

Then, in step S1826, the order receiving application saves the current number of consecutive page transition operations of the same type as the number of previous consecutive page transition operations of the same type.

Then, in step S1827, the order receiving application saves the current page transition operation as the previous page transition operation.

Third Example of Priority Order Table

An example of a priority order table for a total of 60 images, six images to be displayed per page, and the sixth page currently being displayed is illustrated.

FIG. 15A illustrates a priority order table 1900 that is created when the page transition to the "previous page" is performed consecutively a certain number of times or more.

FIG. 15B illustrates a priority order table 2000 that is created when the page transitions to the "next page" is performed consecutively a certain number of times or more.

On the basis of the above priority order tables, image data is read in order, starting from image data for a high-priority page among image data that has not yet been read.

According to the present embodiment, therefore, even in a case where the same type of page transition is performed consecutively a certain number of times or more, an image on a page to be displayed next is preferentially read in advance, by making use of the time during which a user is selecting an image. Therefore, immediately after an instruction for changing a page has been given, an image for the corresponding page can be displayed.

Fourth Embodiment

The first embodiment provides a configuration in which priorities for image data to be read are determined on the basis of the number of user operations required to display each page from the page currently being displayed, and in which image data can be read accordingly.

However, when a medium contains large-size image data and small-size image data, it may not necessarily be effective to only determine priorities for image data to be read on the basis of the number of user operations required to display each page from the page currently being displayed.

For example, there may be large differences in size of associated image data between pages.

In general, the time required to read image data tends to be proportional to the size of the image data. Thus, if the size of image data associated with a page is small, the time required to read image data contained in the page is small. That is, a small size of image data associated with a page results in only a short waiting time until image data contained in the page has been displayed even when the image data is read after the page is displayed.

A large size of image data associated with a page, however, may result in a long waiting time until images in the page have been displayed if the image data is read after the page is displayed.

In other words, the larger the size of the image data, the more pronounced the effect of reading image data during a period for which a user is placing an order. Therefore, in a case where there are large differences in size of associated image data between pages, setting a high priority for a page containing image data of a small size may not necessarily be desirable in the context of the implementations of the present invention.

Accordingly, a fourth embodiment of the present invention provides a configuration in which even in a case where a medium contains large-size image data and small-size image data, an image on a page to be displayed next is preferentially read in advance, by making use of the time during which a user is selecting an image, whereby immediately after an instruction for changing a page has been given, an image for the corresponding page can be displayed.

In the fourth embodiment, portions that are common to those in the first embodiment will not be discussed herein. In the preset embodiment, a process illustrated in FIG. 16 in place of that illustrated in FIG. 6 is executed.

Third Priority Determination Process

FIG. 16 is a flowchart illustrating an exemplary processing procedure for calculating and determining priorities using the order receiving application according to the present invention. The processing of steps S2101 to S2112 is implemented by loading a control program from an external storage device or the like into a memory and executing the control program by using the CPU of the host computer 201.

In step S2101, the order receiving application creates a provisional priority order table (the number of operations). In the present embodiment, the priority determination process according to the first embodiment illustrated in FIG. 6 is adopted.

Then, in step S2102, the order receiving application creates a provisional priority order table (the image data size), which will be described in detail below.

Then, in step S2103, the order receiving application sets a variable (hereafter referred to as "variable i") for holding a page number to 1.

Then, in step S2104, the order receiving application repeats the processing of steps S2105 to S2110 described below until the variable i becomes greater than the value of the last page.

In step S2105, the order receiving application obtains the priority of the i-th page from the priority order table (the number of operations) created in step S2101.

Then, in step S2106, the order receiving application refers to a weight table (the number of operations) 2300 illustrated in FIG. 18A to obtain a score corresponding to the priority obtained in step S2105, which will be described in detail below.

Then, in step S2107, the order receiving application obtains the priority of the i-th page from the provisional priority order table (the image data size) created in step S2102.

Then, in step S2108, the order receiving application refers to a weight table (the image data size) 2400 illustrated in FIG. 18B to obtain a score corresponding to the priority obtained in step S2107, which will be described in detail below.

Then, in step S2109, the order receiving application calculates the total of the score obtained in step 2106 and the score obtained in step S2108, and adds the total to a page grade table.

Then, in step S2110, the order receiving application increases the variable i by one.

Then, in step S2111, the order receiving application arranges the items in the page grade table in order from the item with the highest score.

Then, in step S2112, the order receiving application refers to the page grade table, and adds the pages to the priority order table in order from the page with the highest score.

FIG. 17 is a flowchart illustrating an exemplary processing procedure for creating a provisional priority order table (the image data size) using the order receiving application according to the present invention. The processing of steps S2201 to S2204 is implemented by loading a control program from an external storage device or the like into a memory and executing the control program by using the CPU of the host computer 201.

In the present embodiment, a page currently being displayed may be assigned the first priority regardless of the size of the image data, and the other pages may be assigned priorities in order from the page with the highest sum of the image data sizes. However, any other method may be used. The pages may be assigned priorities in order from the page with the least sum of the image data sizes so that image data as much as possible can be read.

In step S2201, the order receiving application obtains the page number of the page currently being displayed.

Then, in step S2202, the order receiving application adds the currently displayed page to the priority order table.

Then, in step S2203, the order receiving application calculates and determines, for each of the pages, except for the currently displayed page, the sum of the sizes of the image data associated with the page.

Then, in step S2204, the order receiving application adds the pages to the priority order table in order from the page with the highest sum of the image data sizes, which is calculated in step S2203.

Fourth Example of Priority Order Table

FIG. 18A illustrates an example of the weight table (the number of operations) 2300 for adding weights in accordance with the priorities determined on the basis of the number of operations.

FIG. 18B illustrates an example of the weight table (the image data size) 2400 for adding weights in accordance with the priorities determined on the basis of the image data sizes.

FIG. 19 illustrates an example of a page grade table 2500 that is created in step S2109.

FIG. 20 illustrates an example of a priority order table 2600 that is determined using the priority determination process illustrated in FIG. 16.

On the basis of the priority order table 2600, images are read in order, starting from image data for a high-priority page among image data that has not yet been read.

According to the present embodiment, therefore, even in a case where a medium contains large-size image data and small-size image data, an image on a page to be displayed next is preferentially read in advance, by making use of the time during which a user is selecting an image. Therefore, immediately after an instruction for changing a page has been given, an image for the corresponding page can be displayed.

Fifth Embodiment

A configuration of a data processing program that can be read by an information processing apparatus according to the present invention will now be described with reference to FIG. 21.

FIG. 21 is a diagram describing a memory map of a storage medium storing various data processing programs that can be read by an information processing apparatus according to the present invention.

Although not illustrated in FIG. 21, information for managing a program stored in a storage medium, such as version information and author information, may also be stored. In addition, information that depends on the OS of a program reader, such as an icon for displaying a program in a distinguishable manner, may also be stored.

Further, data involved in various programs is also managed in the directory in the memory map. In addition, a program for installing various programs into a computer, a program for decompressing a compressed program to be installed, and the like may also be stored.

Functions in the present embodiment may be implemented by using a host computer according to a program installed from outside. In this case, the present invention may also be implemented by supplying a group of pieces of information including the program to an output device from a storage medium such as a compact disk read-only memory (CD-ROM), a flash memory, or a flexible disk or floppy disk (FD), or from an external storage medium via a network.

Accordingly, it is to be understood that the present invention may also be implemented by providing a storage medium storing program code of software for implementing the functions described above to a system or an apparatus and reading and executing the program code stored in the storage medium by using a computer (or a CPU or a micro-processing unit (MPU)) of the system or apparatus.

In this case, the program code read from the storage medium implements novel functions of the present invention, and the storage medium storing this program code may constitute an embodiment of the present invention.

Therefore, the program may be executed in any form having a program function, such as an object code, a program executed by an interpreter, or script data supplied to an OS.

Examples of storage media that can be used for supplying the program include a flexible disk, a hard disk, an optical disk, a magneto-optical (MO) disk, a CD-ROM, a CD-recordable (CD-R), a CD-rewritable (CD-RW), a magnetic tape, a non-volatile memory card, a ROM, and a digital versatile disk (DVD).

In this case, program code read from a storage medium implements the functions of the foregoing embodiments, and the storage medium storing this program code may constitute an embodiment of the present invention.

Additionally, the program can also be supplied by connecting a client computer to a website on the Internet using a browser of the client computer and then downloading the computer program of the present invention or an automatically-installable compressed file of the program to a recording medium such as a hard disk from the website. Furthermore, the program code constituting the program of the present invention can be divided into a plurality of files, and the individual files can be downloaded from different websites to a recording medium such as a hard disk. In other words, a World Wide Web (WWW) server, a File Transfer Protocol (FTP) server, or any other server that allows multiple users to download a program file for implementing the functional processing of the present invention by using a computer into recording media such as hard disks may also be covered by the claims of the present invention.

The program of the present invention may also be encrypted and stored in a storage medium such as a CD-ROM, and the storage medium may be distributed to users to allow users who meet certain requirements to download key information for decryption from a website via the Internet so that the users can execute the encrypted program by using the key information. Thereby, the program can be installed into a computer and executed.

It is to be understood that, besides the implementation of the functions of the foregoing embodiments by executing read program code by using the computer, for example, an OS or the like running on the computer may perform all or a part of the actual processing in accordance with instructions of the program code so that the functions of the foregoing embodiments can be implemented by this processing.

It is also to be understood that after program code read from a storage medium is written to a function expansion board inserted into a computer or to a memory provided in a function expansion unit connected to the computer, a CPU or the like provided in the function expansion board or function expansion unit may perform all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-317285, filed Dec. 12, 2008, which is hereby incorporated by reference herein in its entirety.

The invention claimed is:

1. An apparatus comprising:
a display control unit configured to, in a case where display target(s) by a display are changed from one or more first display items to one or more second display items in accordance with an operation by a user, cause the display to display the one or more second display items; and
a reading unit configured to read one or more third display items, from a memory, for the displaying by the display control unit in a state where the one or more second display items are displayed on the display by the display control unit and where the one or more third display items are not the display target(s), wherein the reading unit reads the one or more third display items according to a priority, of the one or more third display items, corresponding to a content of an operation which has been performed by a user for making the one or more second display items the display target(s).

2. The apparatus according to claim 1, wherein the display target(s) are one or more images to be displayed.

3. The apparatus according to claim 1, wherein the display control unit causes the display to display a page including a plurality of images.

4. The apparatus according to claim 1, wherein the reading unit reads the one or more third display items according to the priority corresponding to a content of a first operation which has been performed by a user for making the one or more second display items the display target(s) and a content of a second operation which is to be performed by the user for making the one or more third display items the display target(s).

5. The apparatus according to claim 4, wherein the reading unit reads the one or more third display items according to the priority based on whether the content of the first operation and the content of the second operation are same or not.

6. The apparatus according to Claim 5, wherein the display target(s) are changed in accordance with an operation for instructing a direction by a user, and the priority is based on whether a first direction corresponding to the first operation and a second direction corresponding to the second operation are same or not.

7. The apparatus according to claim 6, wherein in a case where the first direction and the second direction are same, one or more display items corresponding to the first direction and the second direction has a higher priority than one or more display items corresponding to a backward direction to a first direction and the second direction.

8. The apparatus according to claim 4, further comprising a determination unit configured to determine the priority of the one or more third display items, and the reading unit reads the one or more third display items according to the priority determined by the determination unit.

9. The apparatus according to claim 8, wherein the determination unit determines the priority based on a number of the second operation(s) required to make the one or more third display items the display target(s).

10. The apparatus according to claim 9, wherein the determination unit sets a high priority for a display item that is displayable with a small number of second operations.

11. The apparatus according to claim 9, wherein the memory is an external memory, and the reading unit reads the display item from the external memory to a memory included in the apparatus.

12. The apparatus according to claim 8, wherein the determination unit determines the priority, based on both of contents of the first and second operations by the user and the one or more second display items.

13. The apparatus according to claim 8, wherein the determination unit determines the priority, based on both of contents of the first and second operations by the user and the one or more third display items.

14. The apparatus according to Claim 13, wherein the determination unit determines the priority, based on the operation by a user and a size of the display item.

15. A method comprising:
  causing, in a case where display target(s) by a display are changed from one or more first display items to one or more second display items in accordance with an operation by a user, the display to display the one or more second display items; and
  reading one or more third display items from the memory for the displaying in a state where the one or more second display items is displayed on the display and where the one or more third display items are not a display target(s),
  wherein the reading reads the one or more third display items according to a priority, of the one or more third display items, corresponding to a content of an operation which has been performed by a user for making the one or more second display items the display target(s).

16. A non-transitory computer-readable storage medium storing a program for causing a computer to execute the method according to claim 7.

* * * * *